United States Patent [19]

Bohnel

[11] 3,998,763
[45] Dec. 21, 1976

[54] CURABLE EPOXY COMPOSITION
[75] Inventor: Bernd Bohnel, Stillwater, Minn.
[73] Assignee: Minnesota Mining and Manufacturing Co., St. Paul, Minn.
[22] Filed: May 19, 1975
[21] Appl. No.: 578,989
[52] U.S. Cl. .......................... 260/2 EC; 260/18 EP; 260/47 EC; 428/273
[51] Int. Cl.² .......................................... C08G 59/40
[58] Field of Search ........ 260/2 EC, 47 EC, 18 EP, 260/78.4 Ep

[56] References Cited
UNITED STATES PATENTS

| | | | |
|---|---|---|---|
| 2,928,807 | 3/1960 | Belanger | 260/78.4 EP |
| 3,210,379 | 10/1965 | Porret | 260/18 EP |
| 3,484,398 | 12/1969 | Childs | 260/18 EP |
| 3,586,616 | 6/1971 | Kropp | 260/78 R |
| 3,632,843 | 1/1972 | Allen et al. | 260/2 EC |
| 3,655,816 | 4/1972 | Lorenz et al. | 260/2 EC |
| 3,842,019 | 10/1974 | Kropp | 260/29.2 EP |

*Primary Examiner*—Paul R. Michl
*Attorney, Agent, or Firm*—Alexander, Sell, Steldt & DeLaHunt

[57] ABSTRACT

Epoxy resin is mixed with a salt of bis(fluoroalkylsulfonyl)methane or fluoroalkylsulfonic acid as a latent catalyst, phosphorus pentoxide, and a base (which acts as an acid scavenger for phosphoric acids resulting from hydration of the phosphorus pentoxide), to provide a one-part, latent, moisture and room temperature curable epoxy resin composition.

16 Claims, No Drawings

CURABLE EPOXY COMPOSITION

This invention relates to a one-part, latent, moisture and room temperature curable epoxy resin composition, and its preparation and use.

Salts of bis(fluoroalkylsulfonyl)methanes and fluoroalkylsulfonic acids have been shown to be useful latent catalysts in the curing of epoxy resins, many of such catalysts and resins being admixed as one-part systems — see U.S. Pat. Nos. 3,632,843 (Allen and Beebe), 3,586,616 (Kropp), 3,842,019 (Kropp), and 3,794,687 (Koshar). When these epoxy resin/latent catalyst mixtures are heated or exposed to actinic light, the latent catalyst is activated by the apparent release or liberation of the free bis(fluoroalkylsulfonyl)methane acid or fluoroalkylsulfonic acid; such acid catalyzes the curing of epoxy resins. According to the instant invention, such epoxy resin/latent catalyst compositions are modified or improved to provide curable compositions which can be cured without requiring heat or actinic light for activation.

Briefly, this invention provides substantially anhydrous one-part, latent, moisture and room temperature curable epoxy resin compositions comprising an admixture of epoxy resin, a salt of bis(fluoroalkylsulfonyl)methane or fluoroalkylsulfonic acid as a latent catalyst for the curing of said epoxy resin, phosphorus pentoxide, and a base which is inert with respect to said epoxy resin, catalyst, and $P_2O_5$, and which functions as an acid scavenger in reacting with the phosphoric acids, especially $H_5P_3O_{10}$, which result upon the hydration of phosphorus pentoxide and would otherwise prematurely release the bis(fluoroalkylsulfonyl)methane and fluoroalkylsulfonic acids from the latent catalyst. These curable compositions when prepared and kept under anhydrous conditions are stable, that is, they have long shelf life at room temperature, but when exposed to or upon contact with water, such as environmental water or moisture, are activated and readily gel and cure at room temperature to form insoluble, infusible polymers having a desired balance of properties. As one-part epoxy resin systems, curable at room temperature upon contact with water or moisture, they can be applied, for example as a general purpose adhesive for various engineering materials, directly from the can in which they are stored and without metering or mixing, the applied composition being curable upon contact with moisture or water and without requiring heat or actinic light.

One type of the latent catalysts useful in this invention is a salt of a bis(fluoroalkylsulfonyl)methane, the latter being an acid by virtue of having its methane carbon atom bonded to at least one hydrogen atom. This type of latent catalyst preferably has the general formula $$[(R_fSO_2)_2C^-R]_nM^{n+} \quad (I)$$

where $R_f$ is fluoroalkyl (preferably perfluoroalkyl) having, for example, 1 to 18 carbons and preferably 1 to 8 carbons; R is hydrogen, a halogen, such as chlorine or bromine, an unsubstituted hydrocarbon radical, such as alkyl having, for example, 1 to 19 carbons and preferably 1 to 8 carbons, a straight chain omegaalkenyl having, for example, 3 to 18 carbon atoms, aryl such as phenyl, or alkaryl such as benzyl, or R can be a substituted hydrocarbon radical having a halogen, lower alkoxy, alkoxycarbonyl, or acyloxy substituent group, for example R can be R'—Y where R' is an alkylene linking group having, for example, 1 to 12 carbons and is preferably methylene or ethylene, and Y is Br, Cl, —OR", or

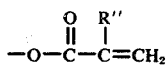

where R" is H or a lower alkyl such as —CH₃, which substituent group has little or no effect under the conditions of use of these compounds as curing catalysts; M is a cation, said cation typically being an ammonium cation, substituted ammonium cation, or a mono- or polyvalent metal cation of a metal such as a metal selected from the group consisting of metals of Groups I to V and VIII, Subgroups VI-B and VII-B, and those of the lanthanide and actinide series of the Periodic Table; and n is an integer of 1 to 3 and equal to the valence of said cation M.

The amino and ammonium salts can be formed by neutralization of the disulfonyl methanes with a salt-forming primary, secondary, or tertiary amine, ammonia, or a quaternary ammonium hydroxide. The salt-forming amines include alkyl amines such as methylamine, ethylamine, dimethylamine, diisopropylamine, trimethylamine, triethylamine, triisopropylamine, triisobutylamine, cyclohexylamine, and the like; heterocyclic amines such as morpholine, pyridine, piperidine, and the like; guanidine; aromatic amines such as aniline, and the like; and quaternary ammonium hydroxides such as tetramethylammonium hydroxide, tetraethylammonium hydroxide, benzyltrimethylammonium hydroxide, and the like.

Representative of the metal cations of such metal salts are those of the metals lithium, sodium, potassium, magnesium, calcium, strontium, barium, yttrium, vanadium, manganese, cobalt, nickel, copper, silver, zinc, cadmium, mercury, lead, bismuth, lanthanium, neodymium, and gadolinium. The salts of the metals of Subgroups IA and IIA are preferred because of the greater shelf life of the curable compositions containing the same. (The Periodic Table referred to herein is that shown on pp. 448–449 of the Handbook of Chemistry & Physics, 34th ed. (1961–1962), published by Chem. Rubber Pub. Co., Cleveland, Ohio.)

When the latent catalysts of formula I are activated in accordance with this invention the acid liberated has the formula $$(R_fSO_2)_2CHR \quad (II)$$

where $R_f$ and R are as defined above in connection with formula I.

The other class of latent catalysts useful in this invention, namely the salts of fluoroalkylsulfonic acids, can be represented by general formula $$[R_fSO_3^-]_nM^{n+} \quad (III)$$

where $R_f$, M, and n are as defined in connection with above formula I. When these latent catalysts are activated in accordance with this invention, they liberate the acid of the formula $$R_fSO_3H \quad (IV)$$

where $R_f$ is as defined above in connection with formula I.

Representative salts useful as latent catalysts in the practice of this invention include $[(CF_3SO_2)_2CH]_2Ba$, $(CF_3SO_2)_2CHLi$, $(CF_3SO_2)_2CH_2\cdot(NH_2)_2C=NH$, $(CF_3SO_2)_2CH_2\cdot N(CH_2CH_3)_3$, $(CF_3SO_2)_2CBrK$, $(CF_3SO_3)_2Cu$, $(CF_3SO_3)_2Zn$.

The latent catalyst salts and their preparation are disclosed in U.S. Pat. Nos. 3,632,843 (Allen and Beebe), 3,586,616 (Kropp), 3,842,019 (Kropp), 3,794,687 (Koshar), and 3,704,311 (Koshar), and those disclosures for that purpose are incorporated herein by reference in the interest of brevity. Such salts are generally prepared by neutralization of the acid precursors (the active form of the latent catalyst) with the corresponding salt-forming metal oxide, hydroxide, or carbonate or metal salt, amine, quaternary ammonium hydroxide or ammonia. Mixtures of the above-described latent catalysts can be used in preparing the curable compositions of this invention.

The latent catalysts are activated upon contact with the phosphoric acids formed upon exposure or contact of the curable composition with water or moisture encountered upon application of the composition, the rate of such activation being faster than the rate of the reaction of the phosphoric acids with the epoxy resin.

In order to prevent or minimize the activation of the latent catalyst during preparation of the curable composition or storage thereof, the curable composition also contains one or more of what has been referred to herein as an acid scavenger. These acid scavengers are bases which form salts with the phosphoric acids and are inert with respect to the epoxy resin, the latent catalyst, and the phosphorus pentoxide components in the composition. Representative acid scavengers useful for this purpose are such organic aprotic Lewis bases as tertiary amines, $R_1R_2R_3N$, tertiary phosphines, $R_1R_2R_3P$, and certain metal salts of fatty acids, $R_4COOM'$, where $R_1$, $R_2$, and $R_3$ are aliphatic groups, such as alkyl or alkenyl having 1 to 18 carbon atoms, preferably 3 to 10 carbon atoms, and substituted alkyl, e.g., haloalkyl, alkoxyalkyl, aralkyl, tert-aminoalkyl, etc., and $R_4$ is an aliphatic radical of a fatty acid having, for example alkyl or alkenyl with 9 to 17 carbon atoms, and $M'$ is an alkali metal or alkaline earth metal cation. Specific representative acid scavengers useful in this invention are triethylamine, tri-n-heptylamine, tri-n-butylphosphine, tri-n-octylphosphine, sodium oleate, sodium stearate, calcium stearate, and mixtures thereof.

The particular amount of latent catalyst in the curable compositions of this invention can vary and will be dependent upon the particular catalyst and epoxy resin used as well as the particular application to be made of the curable composition. Functionally stated, the amount of latent catalyst to be used will be that amount necessary to provide sufficient bis(fluoroalkylsulfonyl)methane or fluoroalkylsulfonic acid to catalyze the curing of the epoxy resin and co-reactants or hardeners, if used in admixture with the epoxy resin. (The term "curable monomers" will be used hereinafter for brevity to mean the epoxy resin as well as mixtures thereof with conventional co-curatives or hardeners.) Generally, this amount of latent catalyst will be 0.01 to 20 weight percent, preferably 0.1 to 5 weight percent, based on the total weight of curable monomers in the curable composition.

The amount of phosphorus pentoxide to be used in the curable compositions will be that amount which is at least enough to produce sufficient phosphoric acids upon hydration of the phosphorus pentoxide to activate the latent catalyst present in the composition. Since phosphorus pentoxide will also hydrate upon contact with any adventitious water or moisture encountered during preparation or storage of the curable composition (despite the effort to maintain anhydrous conditions) and consume all of the unconsumed acid scavenger upon application of the curable composition, the amount of phosphorus pentoxide to be used will be sufficiently in excess of that required to activate the latent catalyst. Generally, the amount of phosphorus pentoxide to be incorporated into the curable compositions of this invention generally will be 0.1 to 10 weight percent, preferably 0.5 to 5 weight percent, based on the total weight of curable monomers in the composition.

The amount of acid scavenger to be used in the curable compositions will be at least that amount sufficient to react with the phosphoric acids produced during preparation or storage of the curable composition which would otherwise release the bis(fluoroalkylsulfonyl)methane or sulfonic acids from the latent catalyst, that is, the strong phosphoric acids that may be prematurely produced. Generally, it has been found that the amount of acid scavenger of 0.01 to 5 weight percent, preferably 0.1 to 2 weight percent, based on the total weight of curable monomers in the curable composition, will be useful.

The curable compositions of this invention are prepared under anhydrous conditions to prevent or minimize the premature hydration of the phosphorus pentoxide therein. Generally, in such preparation, the curable monomers are mixed with the phosphorus pentoxide and acid scavenger components to produce a system in which the latent catalyst is then admixed, forming a one-part latently curable composition which is stored under anhydrous conditions prior to use, for example in a tightly sealed can. During such storage, the curable composition is stable, that is, no significant viscosity change or gelling is discernible. If adventitious moisture is in fact present or encountered during storage despite the precautions taken to insure a anhydrous system, the phosphoric acids consequently produced during storage will be consumed by the acid scavenger, thus maintaining the latency of the catalyst and the system. This latency or shelf life of the anhydrous curable composition has been found to last as long as one year or more at room temperature.

Upon application of the curable composition in a manner where it is adequately exposed to or contacted with water or moisture, e.g. from atmosphere or from the substrate to which the composition is applied, the applied composition becomes functional (as indicated by its tackiness), the phosphoric acids resulting from the hydration of phosphorus pentoxide causing liberation of the bis(fluoroalkylsulfonyl)methane or fluoroalkylsulfonic acid from the latent catalyst to catalyze the curing of the curable monomers admixed therewith. Instead of or in addition to relying on environmental moisture or water to activate the curing of the applied composition, water can be added or applied thereto, e.g., 1 to 5 weight percent based on weight of curable monomers, for example where the applied composition is to be applied in a relatively thick layer, so that there is sufficient exposure or contact of the phosphorus pentoxide in the composition to the water or moisture necessary for complete activation. For most applications of the curable compositions as adhesives to adherends, as a thin film or coating of adhesive for bonding or laminating metals, plastics, ceramic, glass, wood, and fabrics, normal ambient atmosphere usually will contain sufficient moisture to activate the curing of the curable monomers to form solid insoluble, infusible cured product. Generally, the atmosphere should have a relative humidity of at least 20 to 25 percent, atmospheres having relative humidities of 90 percent or more generally resulting in faster curing. The moisture-activated curing will also take place at a sufficient rate at room or low temperatures, e.g., 5° to 30° C, though heating can be used, e.g., 100° C for ½ to 2 hours, to hasten the rate of curing.

The epoxy resins that can be cured in the practice of this invention are those of a widely known and used class of materials. They are cationic sensitive monomers which polymerize by ring opening of O-heterocyclic groups and typically contain one or more epoxy groups, which have the structure

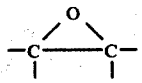

Such monomers, broadly called epoxides, or vicinal epoxides, include epoxy compounds and epoxides of the polymeric type and can be aliphatic, cycloaliphatic, aromatic or heterocyclic and will typically have an epoxy equivalency (i.e., the number of epoxy groups contained in the average molecule) of from 1.0 to 6.0, preferably 1 to 3, this value being the average molecular weight of the epoxide divided by the epoxide equivalent weight. Such epoxide monomers are well known and include such epoxies as epichlorohydrins, e.g. epichlorohydrin, alkylene oxides, e.g., propylene oxide, styrene oxide, alkenyl oxides, e.g., butadiene oxide, glycidyl esters, e.g., ethyl glycidate, glycidyl-type epoxy resins, e.g., the diglycidyl ethers of bisphenol A and of novolak resins, such as described in "Handbook of Epoxy Resins," by Lee and Neville, McGraw-Hill Book Co., New York (1967) and "Epoxy Resin Technology," by P. F. Bruins, John Wiley & Sons, Inc., New York (1968).

Particularly useful epoxides which can be used in this invention are those which contain one or more cyclohexene oxide groups such as the epoxycyclohexanecarboxylates, typified by 3,4-epoxycyclohexylmethyl-3,4-epoxycyclohexanecarboxylate, 3,4-epoxy-2-methylcyclohexylmethyl-3,4-epoxy-2-methylcyclohexanecarboxylate, and bis(3,4-epoxy-6-methylcyclohexylmethyl) adipate. For a more detailed list of useful epoixides of this nature, reference is made to U.S. Pat. No. 3,117,099.

There is a host of commercially available cationic sensitive monomers which can be used in this invention. In particular, epoxides which are readily available include propylene oxide, epichlorohydrin, styrene oxide, vinylcyclohexene oxide, glycidol, glycidyl methacrylate, phenyl glycidyl ether, 1,2-butane oxide, diglycidyl ether of bisphenol A (e.g., "Epon 828" and "DER 332"), vinylcyclohexane dioxide (e.g., "ERL-4206"), 3,4-epoxycyclohexylmethyl-3,4-epoxycyclohexanecarboxylate (e.g., "ERL-4221"), 3,4-epoxy-6-methylcyclohexylmethyl-3,4-epoxy-6-methylcyclohexanecarboxylate (e.g., "ERL-4201"), bis(3,4-epoxy-6-methylcyclohexylmethyl)adipate (e.g., "ERL-0400"), aliphatic epoxy modified with polypropylene glycol (e.g., "ERL-4050" and "ERL-4052"), dipentene dioxide (e.g., "ERL-4269"), epoxidized polybutadiene (e.g., "Oxiron 2001"), silicone epoxy (e.g., "Syl-Ken 90"), 1,4-butanediol diglycidyl ether (e.g., "Araldite RD-2"), polyglycidyl ether of phenolformaldehyde novolak (e.g., "DEN-431", "Epi-Rez 521" and "DEN-438"), resorcinol diglycidyl ether (e.g., "Kopoxite"), polyglycol diepoxide (e.g., "DER 736"), and polyacrylate epoxide (e.g., "Epocryl U-14"), urethane modified epoxide (e.g., "QX3599"), polyfunctional flexible epoxides (e.g., "Flexibilizer 151"), and mixtures thereof as well as mixtures thereof with co-curatives, curing agents, or hardeners which also are well-known (see Lee and Neville and Bruins, supra). Representative of the co-curvatives or hardeners which can be used are acid anhydrides such as nadic methyl anhydride, cyclopentanetetracarboxylic dianhydride, methenedic anhydride, cis-1,2-cyclohexanedicarboxylic anhydride, and mixtures thereof.

The curable epoxy composition of this invention can be used to make shaped articles of self-supporting, structural, filled or reinforced epoxy resin composites, such as glass fiber cloth reinforced epoxy resin composites, useful, for example, as repair materials. The various fillers and reinforcements and other particulate materials to be mixed or coated with or dispersed in the curable compositions of this invention to make the composites of this invention, as well as methods of processing these materials in making the composites, and their applications, are those known to the art. In this connection, reference is made to "Modern Composite Materials," edited by Brautman and Krock, published by Addison-Wesley Publishing Company, Reading, Mass. (1967); and "Handbook of Fiberglass and Advances Plastics Composites," edited by G. Lubin, published by Van Nostrand Reinhold Company (1969).

Illustrative material which can be used as a filler or reinforcement to make the composites of this invention include glass, asbestos, nylon, carbon or graphite, carbon black, silica gel or flour, diatomaceous earth, metallic oxides, such as zinc oxide, magnesium oxide, thoria, aluminum borate, aluminum borosilicate, zirconia, zircon, zirconia-calcia, alumina, magnesium aluminate, and aluminum silicate, metallic powders such as aluminum, bronze or steel. The particular shape or configuration, and size, or such material can vary, e.g. fibers, flakes, spheres, particles, and cloth. Glass, a material particularly useful as a reinforcement, can be in the form of rovings, chopped strands, reinforcing mats, surfacing and overlay mats, yarns, woven fabrics, woven roving, nonwoven fabrics (unidirectional or multi-directional rovings in sheet form). Glass fibers are particularly useful in forming reinforced epoxy composites. One particular type commonly used in a high-strength applications is known as "E-Glass."

The relative amounts of the curable composition and filler or reinforcement material can vary. The curable epoxy composition generally comprises at least 2 percent by weight of the composite article and may include as much as 95 percent. The preferred curable composition will comprise 4 percent to 60 percent by weight of the composite. The characteristics of the composite depend primarily upon the weight ratios of the curable composition and particulate.

Where the curable epoxy composition is used to impregnate a non-woven or woven web, e.g., glass fiber cloth, the resulting room temperature and moisture curable composite can be placed in a suitable moisture impermeable container such as paper-aluminum-polyethylene foil laminate, and the container sealed in a conventional manner to maintain the contents under essentially anhydrous conditions prior to use. Such composites are useful, for example, as repair patches for boat hulls, automobile bodies, and the like.

Any of the known methods of processing composites can be used in making the improved composite articles of this invention. Such processing methods include lay-up techniques (particularly useful in molding the room temperature curable epoxy composition with glass minerals and fiber reinforcements dispersed therein), bag molding (useful for example in molding reinforced preimpregnated material containing the epoxy composition), matched die molding (where the epoxy composition is added to a glass or asbestos mat, chopped glass preformed, or woven, non-woven, or roving cloth or fabric positioned in a mold), and other processing techniques known in the art and described as, for example, in the aforementioned texts.

It is also within the scope of this invention to incorporate into the latently curable compositions such conventional materials as pigments, dyes, plasticizers, extenders, solvents, etc., to establish special properties.

This invention is illustrated in the following examples. In these examples, the handling of phosphorus pentoxide or compositions containing the same was performed under anhydrous conditions unless indicated otherwise.

EXAMPLE 1

Phosphorus pentoxide (218 g) was dispersed in 3,4-epoxycyclohexylmethyl-3,4-epoxycyclohexanecarboxylate ("ERL-4221") (900 g) employing a conventional steel ball mill to prepare a $P_2O_5$/epoxy resin concentrate. The resulting concentrate (160 g) was then added to a mixture of 3,4-epoxycyclohexylmethyl-3,4-epoxycyclohexanecarboxylate ("ERL-4221") (180 g), polyglycidyl ether of phenol formaldehyde novolac ("DEN 438") (400 g), diglycidyl ether of propylene glycol ("DER 732") (90 g), tri-n-octylphosphine (2.4 g), and colloidal silica ("Cab-o-Sil" M 5) (12.0 g). This resulting mixture was allowed to stand at 50° C for 24 hours. Then $[(CF_3SO_2)_2CH]_2Ba$ (0.5 g) was dissolved in 50 g of the resulting mixture by stirring at 50° C for several hours. A sample of the resulting curable composition stored at 50° C under anhydrous conditions did not show any apparent increase in viscosity nor decrease in reactivity over a period of 1 month, thus showing the stability of the composition under ambient, anhydrous conditions. The gel time of this freshly prepared composition at a relative humidity (RH) of 61% and a temperature of 22° C was 17 min. This gel time was determined by applying a thin film of a sample of the curable mixture to the surface of two hardwood tongue depressors and overlapping the coated portions of the depressors with some finger pressure as soon as tackness occured. The "gel time" measured was the time elapsed between application of the curable composition to the depressors and the moment when the adhesive bond therebetween began to respond in an elastomeric manner to a shear force. (At gel time, the overlap shear strength of the bond was 0.35 to 0.7 kg/cm².) After gelling, the applied curable composition cured to a hard, semi-flexible solid.

EXAMPLE 2

A number of curable compositions were prepared in the same manner as in Example 1, employing the same materials and quantities but otherwise using various latent catalysts. The compositions were cured at 22° C and 61% RH. Table 1 summarizes the latent catalysts employed and the gel times of the corresponding curable compositions, the gel times being determined as in Example 1. The cured epoxy product of all compositions was a hard solid.

Table 1

| Latent catalyst | Gel time, min. |
| --- | --- |
| $(CF_3SO_3)_2Cu$ | 120 |
| $(CF_3SO_3)_2Zn$ | 120 |
| $(CF_3SO_2)_2CH_2 \cdot (NH_2)_2C=NH$ | 16 |
| $[(CF_3SO_2)_2CH]_2Ba$ | 17 |
| $(CF_3SO_2)_2CHLi$ | 15 |
| $(CF_3SO_2)_2CBrK$ | 35 |

By comparison, the same formulation devoid of catalyst did not gel under the above during conditions.

EXAMPLE 3

In order to demonstrate that an acid is needed for good shelf life, a curable composition devoid of any scavenger was prepared. Also prepared were compositions containing various scavengers. The manner of preparation of these compositions was otherwise the same as outlined in Example 1, except that each composition was as shown in Table 2.

Table 2

| Ingredient | Amt. of Ingredient, g |
| --- | --- |
| "ERL-4221" epoxy resin | 150 |
| "DEN-438" epoxy resin | 200 |
| "DER-732" epoxy resin | 45 |
| "Silanox" 101 colloidal silica | 8.2 |
| $P_2O_5$ | 16 |
| $(CF_3SO_2)_2CHK$ | 4.5 |
| Scavenger | 0 to 2.7 |

The gel times of the freshly prepared compositions were determined as in Example 1. The various compositions were stored under anhydrous conditions at 50° C for 1 month and then the viscosity of the aged samples was visually compared to that of the fresh samples. When exposed to atmospheric moisture after the 1-month period, the samples containing scavenger gelled and eventually cured into solids. Table 3 summarizes the results.

Table 3

| Scavenger Type | Amt., g. | Gel time of freshly prepared compositions at about 20° C, 50% RH, min. | Appearance of anhydrous composition after 1 month at 50° C |
| --- | --- | --- | --- |
| Tri-n-octylphosphine | 1.8 | 15 | unchanged viscosity[a] |
| Tri-n-heptylamine | 1.8 | 14 | unchanged viscosity[a] |
| Sodium oleate | 2.7 | 11 | unchanged viscosity[a] |
| None | 0 | 12 | gelled |

[a] The gel times of these aged samples were essentially the same as those of the fresh samples.

EXAMPLE 4

This example is to demonstrate how increasing the relative amount of catalyst in the curable composition decreases the gel time under ambient moisture conditions.

A mixture of "ERL 4221" epoxy resin (300 g), phosphorus pentoxide (10 g), and tri-n-octylphosphine (1.2 g) was prepared following the procedure of Example 1. Various amounts of $(CF_3SO_2)_2CHK$ were then dissolved in samples (30 g each) of this mixture. Table 4 shows the relation of the gel time to the amount of latent catalyst used, the gel time being determined as in Example 1. All compositions eventually cured into solids.

Table 4

| Amount of $(CF_3SO_2)_2CHK$ used, g. | Gel time at about 20° C, 50% RH, min. |
|---|---|
| 0.05 | 360 |
| 0.10 | 40 |
| 0.30 | 10 |
| 0.60 | 6 |
| 1.2 | 4 |

EXAMPLE 5 the cure rate of the moisture curable composition also depends on the amount of phosphorus pentoxide used. Compositions containing "ERL 4221" epoxy resin (30 g) tri-n-octylphosphine (0.12 g), $(CF_3SO_2)_2CHK$ (0.60 g) and various amounts of phosphorus pentoxide were prepared and the gel times determined. The results are set forth in Table 5, the gel time being determined as in Example 1. All compositions eventually cured into solids.

Table 5

| Amount of $P_2O_5$ used, g. | Gel time at about 20° C, 50% RH, min. |
|---|---|
| 1.5 | 3.5 |
| 0.90 | 4 |
| 0.60 | 6 |
| 0.30 | 23 |
| 0.15 | 300 |

EXAMPLE 6

Curable compositions exhibiting a desirable balance of adhesive properties were prepared according to the method of Example 1 using the ingredients and relative amounts listed in Table 6.

Table 6

| Composition, parts by weight Ingredient | A | B |
|---|---|---|
| "DEN-438" epoxy resin | 200 | 150 |
| "DER-732" epoxy resin | 65 | 65 |
| "ERL-4221" epoxy resin | 40 | 90 |
| Phosphorus pentoxide | 10 | 10 |
| "Cab-o-Sil" M 5 silica gel | 4.5 | 6.0 |
| Tri-n-octylphosphine | 1.2 | 1.2 |
| $(CF_3SO_2)_2CHK$ | 3.0 | 3.0 |

For adhesive purposes, the curable compositions were applied over the surface of an aluminum sheet to be joined to the surface of another aluminum sheet. The sheets were allowed to stand in a normal moisture-containing atmosphere until the adhesive developed tackiness. The surfaces to be bonded were overlapped and the assembly of sheets allowed to cure at room temprature (about 20° C) and a pressure of 3.5 kg/cm² for 24 hours. Subsequently, the samples were aged for 6 days at room temperature and physical measurements made of the bonded assembly. The data in Table 7 demonstrates the superior overlap shear and T-peel strength of aluminum to aluminum bonds obtained with Composition A and Composition B of Table 6.

(Compositions A and B as prepared above were each loaded in dispenser tubes as follows. A glass bottle containing the composition was fitted with a stopper through which two glass tubes passed, each fitted with a stopcock. The bottle was placed upside-down and pressurized via one glass tube with dried nitrogen, forcing the composition via the other glass tube into the lower open end or tail of a standard collapsible lead dispenser tube having its cap screwed on. After filling the tube, the tail was crimped to seal the tube.)

Table 7

| Overlap shear strength[a], kg/cm² | | | | T-peel strength[b], kg/cm width | |
|---|---|---|---|---|---|
| at -20° C | at 20° C | at 100° C | After 24 hr. in boiling water[c] | at about 20° C | After 24 hr. in boiling water |
| 36 | 127 | 15 | 48 | 0.8 | 0.5 |
| 31 | 141 | 24 | 44 | 0.5 | 0.3 |

[a] The free ends of strips 2.5 cm wide, 10.2 cm long, of 1.6 mm 2024 T3 clad aluminum alloy sheeting, bonded together at their other ends with adhesive 0.1 mm thick in a 1.3 cm overlapping joint, are pulled in opposite directions along their longitudinal axes.

[b] The adjacent ends of 2.5 cm wide, 20.3 cm long strips of 0.5 mm 2024 T3 clad aluminum alloy sheeting adhered together over most of their length with adhesive 0.1 mm thick are bent apart at right angles and are pulled in opposite directions.

[c] The test was performed after immersing the samples in boiling water for 24 hours.

The overlap shear strength of aluminum-to-aluminum bonds formed with Composition A was determined at various time intervals after application at a relative humidity of 50% and a temperature of about 20° C. The manner of application of the adhesive was similar to that described above. The results are listed in Table 8.

Table 8

| Time to reach observed strength, hours | Overlap shear strength, kg/cm² |
|---|---|
| 0.5 | 0.4 |
| 0.75 | 0.7 |
| 1.0 | 2.1 |
| 1.25 | 5.3 |
| 3.25 | 10.2 |
| 5.25 | 25.3 |
| 6.25 | 37.3 |

Table 8-continued

| Time to reach observed strength, hours | Overlap shear strength, kg/cm² |
|---|---|
| 24 | 85.1 |

The gel times of Composition A and Composition B at about 20° C were determined at various levels of relative humidity, using a procedure like that of Example 1. The results, shown in Table 9, demonstrate an increase in the gel time with a decrease in relative humidity.

Table 9

| | Gel time, min. | | | | |
|---|---|---|---|---|---|
| Composition | at 32% RH | at 45% RH | at 53% RH | at 65% RH | at 85% RH |
| A | 40 | 26 | 15 | 15 | 15 |
| B | 42 | 30 | 23 | 21 | 22 |

Compositions A and B were used to saturate a fiber glass cloth (0.3 mm thick). The saturated cloths were then adhered to clad aluminum alloy sheets (0.5 mm 2024 T3) and allowed to cure at about 20° C and 50% RH. The time to reach the tackfree state, the pencil hardness as a function of cure time, the thickness of the cured laminate and the T-peel strength were determined. The results are set forth in Table 10 and Table 11.

Table 10

| Composition | Time to reach tackfree state, hours | Thickness of cured laminate, mm | T-peel strength[a], kg/cm width |
|---|---|---|---|
| A | 1.5 | 0.7 | 1.8[b] |
| B | 1 | 0.6 | 1.3 |

[a] The measurement was performed after aging for one week at about 20° C and 30% RH.
[b] The fiber glass cloth failed rather than the bond between the cloth and the aluminum sheet.

Table 11

| Time to reach observed hardness, hours | Pencil hardness[a] | |
|---|---|---|
| | Composition A | Composition B |
| 3 | 6B | 5B |
| 4 | 6B | B |
| 5 | 3B | B |
| 6 | 3B | HB |
| 24 | 3H | 3H |
| 72 | 3H | 3H |

[a] By the disbonding method according to H. C. Woodruff, "Journal of Paint Technology", 38,691 (1966).

EXAMPLE 7

Moisture curable compositions containing epoxy resins and carboxylic anhydride co-reactants were prepared in a manner outlined in Example 1. The shelflife of these mixtures at room temperature was noted. The time for a sample, spread out in a film 0.3 to 0.4 mm thick, to cure into a hard solid at a relative humidity of 30% and at room temperature was also recorded. In Table 12 a summary of the compositions is given and in Table 13 the corresponding physical data is given.

Table 12

| Ingredient | Composition, parts by weight | | | | | |
|---|---|---|---|---|---|---|
| | 1 | 2 | 3 | 4 | 5 | 6 |
| "ERL-4221" epoxy resin | | | 25 | | 25 | 20 |
| "ERL-4289" epoxy resin | 25 | 25 | | 25 | | |
| Methendic anhydride | 10 | | | | | 10 |
| Nadic methylanhydride | | 10 | 15 | | | |
| Cis-1,2-cyclohexane-dicarboxylic anhydride | | | | 10 | 10 | |
| $P_2O_5$ | 1.0 | 1.0 | 1.0 | 1.0 | 1.0 | 1.0 |
| $(CF_3SO_2)_2CHK$ | 0.4 | 0.4 | 0.4 | 0.4 | 0.4 | 0.4 |
| Tri-n-heptyl amine | 0.2 | 0.2 | 0.2 | 0.2 | 0.2 | 0.25 |

Table 13

| Composition | Cure time at about 20° C, 30% RH, hours | Shelf life at about 20° C, months[a] |
|---|---|---|
| 1 | 2 | >3 |
| 2 | 48 | 3 |
| 3 | 48 | 2 |
| 4 | 96 | 1 |
| 5 | 96 | 1 |
| 6 | 0.5 | 2 |

[a] The shelf life reported is the time for the freshly prepared composition to change from the liquid to non-liquid state under anhydrous conditions.

EXAMPLE 8

This example describes a method of obtaining a structural foam from an aerosol container. A mixture of "ERL-4221" epoxy resin (500 g), methendic anhydride (400 g), phosphorus pentoxide (29 g), tri-n-heptylamine (1.5 g) and $(CF_3SO_2)_2CHK$ (10.0 g) was prepared in the manner outlined in Example 1. An aerosol container was then charged with this mixture (50 g), a surfactant ("3M" Fluorochemical 430) (0.5 g), a collodial silica ("Cab-o-Sil" M 5) (1.5 g), and finally with a propellant ("Freon " 12) (20 g).

The aerosol container filled in this manner discharged a product which at ambient moisture conditions cured into a rigid structural foam (with a closed cell structure and a density of about 0.2 g/cc) at room temperature.

Various modifications and alterations of this invention will become apparent to those skilled in the art without departing from the scope and spirit of this invention, and it should be understood that this invention is not to be unduly limited to the illustrative embodiment set forth herein.

I claim:

1. A storage stable, moisture and room temperature curable epoxy resin composition comprising curable materials comprising epoxy resin, a salt of bis(-fluoroalkylsulfonyl)methane or fluoroalkylsulfonic acid as a latent catalyst for the curing of said curable materials, an amount of phosphorus pentoxide to produce upon hydration thereof sufficient phosphoric acids to activate said latent catalyst when said composition is applied, and a base which is inert with respect to said curable materials, catalyst, and phosphorus pentoxide and is present in an amount sufficient to react and form salts with phosphoric acids formed by hydration of said phosphorus pentoxide upon contact thereof with adventitious moisture during preparation and storage of said composition, said base having the formula $R_1R_2R_3P$, where $R_1$, $R_2$ and $R_3$ are aliphatic groups.

2. A process for preparing a moisture and room temperature curable epoxy resin composition which comprises mixing, under anhydrous conditions, curable epoxy resin, phosphorus pentoxide, and a base, and then mixing the resulting mixture with a salt of bis(-fluoroalkylsulfonyl)methane or fluoroalkylsulfonic acid as a latent catalyst for curing of said curable epoxy resin, said phosphorus pentoxide being present in at least that amount to produce upon hydration thereof sufficient phosphoric acids to activate said latent catalyst when said composition is applied, said base being inert with respect to said curable epoxy resin, catalyst, and phosphorus pentoxide and present in an amount sufficient to react and form salts with phosphoric acids formed by hydration of said phosphorus pentoxide upon contact thereof with adventitious moisture during preparation and storage of said composition, said base having the formula $R_1R_2R_3P$, where $R_1$, $R_2$ and $R_3$ are aliphatic groups.

3. A storage stable, moisture and room temperature curable epoxy resin composition comprising an admixture of curable epoxy resin having more than one epoxy group and one or more cyclohexeneoxide groups per molecule and curable acid anhydride co-reactant, 0.1 to 5 weight percent of a latent catalyst for the curing of said curable materials, said latent catalyst having the general formula $$[(R_fSO_2)_2C^-F]_nM^{n+}$$

where $R_f$ is fluoroalkyl, R is hydrogen, halogen or a hydrocarbon radical, M is an ammonium cation or a metal cation, and n is an integer of 1 to 3 and equal to the valence of said cation M, 0.5 to 5 weight percent of phosphorus pentoxide, and 0.1 to 2 weight percent of a base which is inert with respect to said curable materials, catalyst, and phosphorus pentoxide and reacts and forms salts with phosphoric acids formed by hydration of said phosphorus pentoxide upon contact thereof with adventitious moisture during preparation and storage of said composition, said base having the formula $R_1R_2R_3P$, where $R_1$, $R_2$, and $R_3$ are aliphatic groups, said weight percents being based on the total weight of said curable materials.

4. The composition according to claim 3 wherein said epoxy resin is 3,4-epoxycyclohexylmethyl-3,4-epoxycyclohexanecarboxylate; said acid anhydride is methendic anhydride, nadic methyl anhydride, or cis-1,2-cyclohexanedicarboxylic anhydride, or mixtures thereof; said catalyst is $(CF_3SO_2)_2CHK$; and said base is tri-n-octylphosphine.

5. The composition according to claim 1 where said latent catalyst has the general formula $$[(R_fSO_2)_2C\ 116R]_nM^{n+}$$

where $R_f$ is fluoroalkyl, R is hydrogen, halogen or a hydrocarbon radical, M is an amonium cation or a metal cation, and n is an integer of 1 to 3 and equal to the valence of said cation M.

6. The composition of claim 1 wherein said latent catalyst is $[(CF_3SO_2)_2CH]_2Ba$, $(CF_3SO_2)_2CHK$, $(CF_3SO_2)_2CHLi$, $(CF_3SO_2)_2CH_2 \cdot (NH_2)_2C=NH$, $(CF_3SO_2)_2CH_2 \cdot N(CH_2CH_3)_3$, $(CF_3SO_2)_2CBrK$, $(CF_3SO_3)_2Cu$, or $(CF_3SO_3)_2Zn$.

7. The composition according to claim 1 wherein said catalyst has the formula $$[R_fSO_3^-]nM^{n+}$$

where $R_f$ is fluoroalkyl, M is an ammonium cation or a metal cation, and n is an integer of 1 to 3 and equal to the valence of said cation.

8. The composition of claim 1 wherein said latent catalyst is $[(CF_3SO_2)_2CH]_2Ba$.

9. The composition of claim 1 wherein said latent catalyst is $(CF_3SO_2)_2CHK$.

10. The composition of claim 1 wherein said base is tri-n-butylphosphine, tri-n-octylphosphine, or mixtures thereof.

11. The composition according to claim 1 wherein the amount of said latent catalyst is 0.01 to 20 weight percent, the amount of said phosphorous pentoxide is 0.1 to 10 weight percent, and the amount of said base is 0.01 to 5 weight percent, said weight percents being based on the total weight of said curable materials.

12. The composition of claim 1 wherein said curable epoxy resin is 3,4-epoxycyclohexylmethyl-3,4-epoxycyclohexanecarboxylate, polyglycidyl ether of phenolformaldehyde novalak or digylcidyl ether of propylene glycol, or mixtures thereof.

13. The composition according to claim 1 wherein said curable materials include methendic anhydride, nadic methylanhydride, cis-1,2-cyclohexanedicarboxylic anhydride, or mixtures thereof.

14. A composite comprising a filler or reinforcement and the composition of claim 1.

15. A storage stable, moisture and room temperature curable composition comprising polyglycidyl ether of phenoloformaldehyde novolac, diglycidyl ether of propylene glycol, 3,4-epoxycyclohexylmethyl-3,4-epoxycyclohexanecarboxylate, phosphorus pentoxide, tri-n-octylphosphine, and $(CF_3SO_2)_2CHK$, the latter being a latent catalyst for the cure of the curable epoxy material in said composition, the amount of said phosphorus pentoxide being at least that amount to produce upon hydration thereof sufficient phosphoric acids to activate said latent catalyst when said composition is applied, said phosphine being present in an amount sufficient to react and form salts with phosphoric acids formed by hydration of said phosphorous pentoxide upon contact thereof with adventitious moisture during preparation and storage of said composition.

16. A storage stable, moisture and room temperature curable composition comprising 3,4-epoxycyclohexylmethyl-3,4-epoxycyclohexanecarboxylate, methendic anhydride, phosphorus pentoxide, tri-n-heptylamine, and $(CF_3SO_2)_2CHK$, the latter being a latent catalyst for the cure of the curable epoxy material in said composition, the amount of said phosphorus pentoxide being at least that amount to produce upon hydration thereof sufficient phosphoric acids activate said latent catalyst when said composition is applied, said amine being present in an amount sufficient to react and form salts with phosphoric acids formed by hydration of said phosphorus pentoxide upon contact thereof with adventitious moisture during preparation and storage of said composition.

* * * * *

UNITED STATES PATENT AND TRADEMARK OFFICE
CERTIFICATE OF CORRECTION

PATENT NO. : 3,998,763
DATED : December 21, 1976
INVENTOR(S) : Bernd Bohnel

It is certified that error appears in the above-identified patent and that said Letters Patent are hereby corrected as shown below:

Col. 8, line 26: "acid" should read -- acid scavenger -- .

Col. 9, line 27: "the" should read -- The -- .

Col. 10, line 2: "Composition, parts by weight" should be located over the A and B columns.

Col. 13, line 57: "$[(R_fSO_2)_2C^-F]_nM^{n+}$" should read -- $[(R_fSO_2)_2C^-R]_nM^{n+}$ --.

Col. 14, line 15: "$[(R_fSO_2)_2C116R]_nM^{n+}$" should read -- $[(R_fSO_2)_2C^-R]_nM^{n+}$ --

Col. 14, Line 17: "amonium" should be -- ammonium --.

Col. 14, line 28: "$[R_fSO_3-]nM^{n+}$" should read -- $[R_fSO_3^-]_nM^{n+}$ --

Signed and Sealed this

Twenty-eighth Day of February 1978

[SEAL]

Attest:

RUTH C. MASON
Attesting Officer

LUTRELLE F. PARKER
Acting Commissioner of Patents and Trademarks